Patented June 26, 1951

2,557,956

UNITED STATES PATENT OFFICE 2,557,956

PROCESS OF EXTRACTING SESAMIN FROM SESAME OIL

Louis Feinstein, Hyattsville, and Samuel J. Ringel, Greenbelt, Md., dedicated to the free use of the People in the territory of the United States No Drawing. Application September 20, 1949, Serial No. 116,861

4 Claims. (Cl. 260—345)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

We hereby dedicate the invention herein described to the free use of the people in the territory of the United States to take effect on the granting of a patent to us.

This invention relates to a process of extracting sesamin from sesame oil or sesame oil concentrate.

Insecticidal compositions containing sesame oil or sesame oil extractives in admixture with pyrethrum extract are used to combat insect pests, such as flies, mosquitoes, gnats and the like. The sesame oil extractives have little insecticidal property in themselves but increase the toxicity of pyrethrum to a marked extent. Sesamin is the active ingredient in these sesame oil extractives and it would be of advantage to have a simple method of freeing sesamin from the other components in these extractives.

In a preferred embodiment of the invention, sesame oil or sesame oil concentrate is chilled to a low temperature. Temperatures such as 0° C. or below are employed. A mixture of acetone and solid carbon dioxide (Dry Ice) may be used as external refrigerant. To the chilled sesame oil, or chilled concentrate, is added petroleum ether. The sesamin, being insoluble in the petroleum ether, precipitates. The oil and the other components of the sesame oil remain in solution in the petroleum ether. The crystalline crude sesamine precipitate is removed by filtration and washed with petroleum ether to remove the oil and other extractives from the surface of the crystals.

This crude washed sesamin is purified by dissolving in boiling alcohol, for example in 95% ethyl alcohol, with or without a small portion of acetone. The solution is filtered and the sesamin crystallized out upon cooling. The dark supernatant solution is filtered off and the crystals recrystallized again from boiling alcohol and acetone as in the first purification. Pure sesamin is identified by its melting point (121–122° C.) and the melting points of the following derivatives: The dibromosesamin (180–181° C.), the dinitrosesamin (245° C.), and the dichlorosesamin (191° C.).

Experiments were conducted to determine the effect of varying the volume of hydrocarbon solvent diluent and also the effect of changing the hydrocarbon fraction used. A solution of sesame oil and sesamin was prepared using 100 ml. of oil and 1 gram of sesamin. In Experiment 1, the solution of oil and sesamin was diluted with a petroleum ether hydrocarbon called Skelly A, consisting mainly of n-pentane, having a boiling range 28–38° C. The temperature was −2° C. In Experiment 2, a dilution was made at a temperature of −75° C., but using different hydrocarbons for diluting the sesame oil-sesamin solution.

*Experiment 1*

| Hydrocarbon used | Original Vol. (oil-sesamin) (ml.) | Hydrocarbon Vol. added (ml.) | Final Vol. (ml.) | Gms. Sesamin Precipitated | Gms. Sesamin still in solution | Per cent oil in final Volume | Gms. sesamin left in per 100 ml. of final sol. volume |
|---|---|---|---|---|---|---|---|
| Skelly "A" (mainly n-pentane), Boiling range 28–38° C | 100 | --- | 100 | --- | 1.0 | 100 | 1.00 |
| | 100 | 100 | 200 | (¹) | 1.0 | 50 | 0.50 |
| | 100 | 300 | 400 | 0.4 | 0.6 | 25 | 0.15 |
| | 100 | 500 | 600 | 0.6 | 0.4 | 17 | 0.07 |

¹ Few crystals.

*Experiment 2*

| Hydrocarbon used | Original Vol. (oil-sesamin) (ml.) | Hydrocarbon Vol. added (ml.) | Final Vol. (ml.) | Gms. Sesamin Precipitated | Gms. Sesamin still in solution | Per cent oil in final Volume | Gms. sesamin left in per 100 ml. of final sol. volume |
|---|---|---|---|---|---|---|---|
| n-pentane (28–38° C.) | 100 | --- | 100 | --- | 1.0 | 100 | 1.00 |
| Hexane-pentane (40–75° C.) | 100 | 600 | 700 | 0.4 | 0.6 | 14 | 0.08 |
| n-hexane (60–70° C.) | 100 | 600 | 700 | 0.4 | 0.6 | 14 | 0.08 |
| n-heptane (86–100° C.) | 100 | 600 | 700 | 0.2 | 0.8 | 14 | 0.11 |
| | 100 | 600 | 700 | 0.0 | 1.0 | 14 | 0.14 |

The above examples are not to be construed as limitative.

The petrolum ether can be added to the sesame oil before chilling. Any chilling temperature that is not lower than the congealing point of the sesame oil can be used.

The preferred solvents are the normally liquid paraffin hydrocarbons having no more than nine carbon atoms; for example, pentanes, hexanes, and heptanes, each alone or in admixture. Solvents such as liquified propane or butane, requiring complicated apparatus, are not included in the preferred solvents. Nor do the high molecular weight hydrocarbons such as the deobases, offer any advantages over the lower hydrocarbons, since they are not as readily removed from the sesamin precipitate by evaporation. The hydrocarbon solvents boiling at no higher than 100° C. are preferred, since they readily evaporate from the sesamin. However, as indicated by the tables above, petroleum ether boiling in the range 28–38° C. is markedly superior for use in a practical range of volume of diluent.

The process has its chief utility when applied directly to sesame oil, without making the sesamin concentrate first. The term "sesame oil" as employed in the claims has its customary meaning; it means the oil of sesamin and not sesamin concentrate prepared from oil of sesamin.

Having thus described our invention, we claim:

1. The process of obtaining sesamin from sesame oil comprising extracting sesame oil by contacting it with several volumes of a normally liquid paraffin hydrocarbon solvent for the oil of sesame, said solvent being one which boils at no higher than about 75° C., the extraction being carried out at a temperature no higher than 0° C. and above the congealing point of the oil of sesame, separating the crude sesamin precipitate from the sesame oil-hydrocarbon solution.

2. The process of extracting sesamin from sesame oil comprising contacting sesame oil with at least an equal volume of petroleum ether at a temperature no higher than about 0° C. and above the congealing point of the oil, and filtering off the precipitate of sesamin crystals.

3. The process of extracting sesamin from sesame oil comprising contacting sesame oil with several volumes of petroleum ether at a temperature no higher than about 0° C. and above the congealing point of the oil, and filtering off the precipitate of sesamin crystals, and washing the precipitate with petroleum ether, dissolving it in boiling ethyl alcohol, and cooling to crystallize out the sesamin.

4. The process of obtaining sesamin from sesame oil comprising contacting sesame oil with a solvent substantially comprising normal pentane at a temperature in the range 0° C. to −75° C., several volumes of the solvent being present, and separating the sesamin crystals precipitated.

LOUIS FEINSTEIN.
SAMUEL J. RINGEL.

REFERENCES CITED

The following references are of record in the file of this patent:

UNITED STATES PATENTS

| Number | Name | Date |
| --- | --- | --- |
| 2,467,903 | Omohundro | Apr. 19, 1949 |
| 2,467,904 | Omohundro | Apr. 19, 1949 |

OTHER REFERENCES

Heilbron: Dictionary of Organic Compounds, vol. III, pp. 626 and 627 (1938).